United States Patent
Morava

Patent Number: 5,616,969
Date of Patent: Apr. 1, 1997

[54] POWER DISTRIBUTION SYSTEM HAVING SUBSTANTIALLY ZERO ELECTROMAGNETIC FIELD RADIATION

[76] Inventor: Irena Morava, 12 Strathroy Crescent, Markham, Ontario, Canada, L3P 2E6

[21] Appl. No.: 501,147

[22] Filed: Jul. 11, 1995

[51] Int. Cl.⁶ .................................................. H04B 3/26
[52] U.S. Cl. .................................... 307/91; 174/35 R
[58] Field of Search ...................... 307/89–91, 104; 361/107; 333/12, 177; 174/32–34, 36, 40 R, 43, 35 R, 35 MS

[56] References Cited

U.S. PATENT DOCUMENTS

| | | | |
|---|---|---|---|
| 2,030,935 | 2/1936 | Pfaff | 307/90 |
| 2,466,629 | 4/1949 | Weaver | 307/90 |
| 5,019,685 | 5/1991 | Nishimura | 174/32 |
| 5,218,507 | 6/1993 | Ashley | 307/91 |

*Primary Examiner*—Richard T. Elms
*Attorney, Agent, or Firm*—David W. Wong

[57] ABSTRACT

Coaxially sheathed single core conductors are employed in this power distribution system. A current of equal magnitude and opposite in direction to that flowing in each core conductor is fed back through the coaxial sheath of that conductor so as to create a neutralizing magnetic field generated by the current flowing through each core conductor to result in substantially no magnetic field emitting from the distribution lines. It also reduces line reactance to provide more even current distribution of the current amongst the parallel conductors.

8 Claims, 1 Drawing Sheet

POWER DISTRIBUTION SYSTEM HAVING SUBSTANTIALLY ZERO ELECTROMAGNETIC FIELD RADIATION

BACKGROUND OF THE INVENTION

This invention relates to electrical power distribution systems either indoor or outdoor and more particularly to a power distribution system in which substantially no electromagnetic field is radiated from its transmission lines.

In a power distribution system, the high current flowing through the transmission lines radiates extremely high electromagnetic fields into the vicinity around the lines. Such high electromagnetic fields cause interferences with other electrical appliances operating nearby to the transmission lines. Furthermore, it is well known that the high electromagnetic fields radiating from the power distribution lines also may cause harmful health effect to the people living or working near such transmission lines and exposing constantly to the electromagnetic fields over a long period of time.

Heretofore, attempts have been made to shield the transmission lines in order to confine the electromagnetic fields radiating from these lines. Each transmission line, after it is installed, is provided over its entire length with an external shield layer or enclosure made of a ferromagnetic material in order to suppress the electromagnetic field. However, such method is expensive and difficult to carry out; and yet, the electromagnetic fields still exist outside of the shield.

Circulating currents in the metallic enclosures of gas insulated distribution systems and on high voltage cables, introduced by bonding such enclosures on both ends are also known to reduce the external electromagnetic field. However, these circulating currents themselves are induced to the enclosure by the external electromagnetic field, thus by virtue of their linking with the external field they cannot eliminate electromagnetic field entirely and significant external electromagnetic field is still radiated from these lines.

In U.S. Pat. No. 2,030,935 to Georg Pfaff it is shown a method of reducing the spurious induced current in the cable sheath of high voltage alternating current single core power lines. The spurious induced current generates undesirable heat in the cable sheath to cause its accelerated deterioration. In this patent a plurality of cross connections are provided between the sheath of neighbouring single core transmission lines so as to eliminate the spurious current. Such provision is therefore not primarily intended to reduce the electromagnetic field radiation from the power lines and as discussed above inherent electromagnetic field radiation still emits from the power lines. Furthermore, such method is not applicable to direct current power lines.

SUMMARY OF THE INVENTION

It is a principal object of the present invention to provide a system in which effectively and substantially zero electromagnetic field is radiated from the power distribution lines.

It is another object of the present invention to provide a system in which it is not necessary to provide a ferromagnetic enclosure over the entire length of the power distribution line It is yet another object of the present invention to provide a system which is operative both for alternating current and direct current power distribution lines to eliminate effectively and substantially the electromagnetic field radiation therefrom.

It is still yet another object of the present invention to provide a system in which the elimination of electromagnetic radiation can be carried out easily and simply.

Briefly, the system comprises conducting the current through coaxially shielded single conductor lines. A current equal in magnitude and flowing in the opposite direction is fed back in the shield either through the load or with an external current source. The electromagnetic fields generated in the core conductor and the shield will thus neutralize each other resulting in no net electromagnetic field radiating to the environment from such transmission lines.

BRIEF DESCRIPTION OF THE DRAWINGS

Other objects of this invention will appear in the following description and appended claims, reference being made to the accompanying drawings forming a part of the specification wherein like reference numerals designate corresponding parts in the several views. In the drawings

DESCRIPTION OF THE PREFERRED EMBODIMENTS

Figure 1:
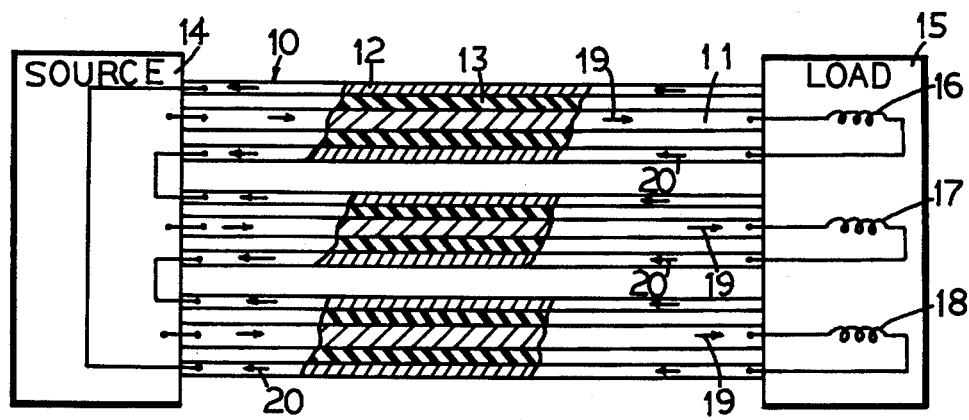
FIG. 1 is a schematic diagram showing the feedback of same current in the opposite direction through the shield of the transmission line from the load according to the present invention.

Reference to the drawings wherein like reference numerals designate corresponding parts in the several views, the power distribution system comprises of three single conductor power distribution lines or cables 10. Such cables may carry a high or low single or poly phase electrical voltage from a power source to the ultimate load over a relatively long distance. Each one of the three cables 10 consists of a main conductor 11 surrounded by a coaxial sheath 12, which are insulated from each other by coaxial insulation 13 and designed to carry the full load current. For simplicity of illustration, no outer electrical insulation over the sheath 12 is shown; however, such insulation may also be provided. The coaxial sheath 12 may be made of stranded electrical conductive wires or a solid tube made of either copper or aluminum.

As best shown in FIG. 1, the electrical power is transmitted from a control switch board 14 at the power source, by the single core cables 10 to a three-phase load 15 typically a transformer at the receiving station. The phase windings of the transformer 15 are schematically represented by inductive loads 16, 17 and 18. Such three-phase transformer is normally employed at the substation to reduce the transmission line voltage to a lower voltage for end use. The main current 19 flows in the conductor 11 to the Y-connected transformer windings, and the supplementary or feedback current 20 of equal magnitude and opposite direction in the sheath 12 may simply be obtained through the star point of the Y-connection which is provided by connecting the coaxial sheath 12 of the cables 10 together at the substation. With such simple connections, currents of equal magnitude and opposite in direction to one another are thus achieved in the main conductor 11 and the sheath 12, therefore the magnetic field generated by the currents in the conductor 11 and the sheath 12 are equal and opposite to one another to neutralize one another, resulting in substantially no net magnetic field radiated from each of the transmission lines 10. Similar simple connection may be provided with a delta-connected load in which the phase connection can be opened, the common connection is provided by connecting the common point to the sheath 12 at the load and connecting the sheath 12 together at the main switchboard 14 at the source station.

Figure 2:
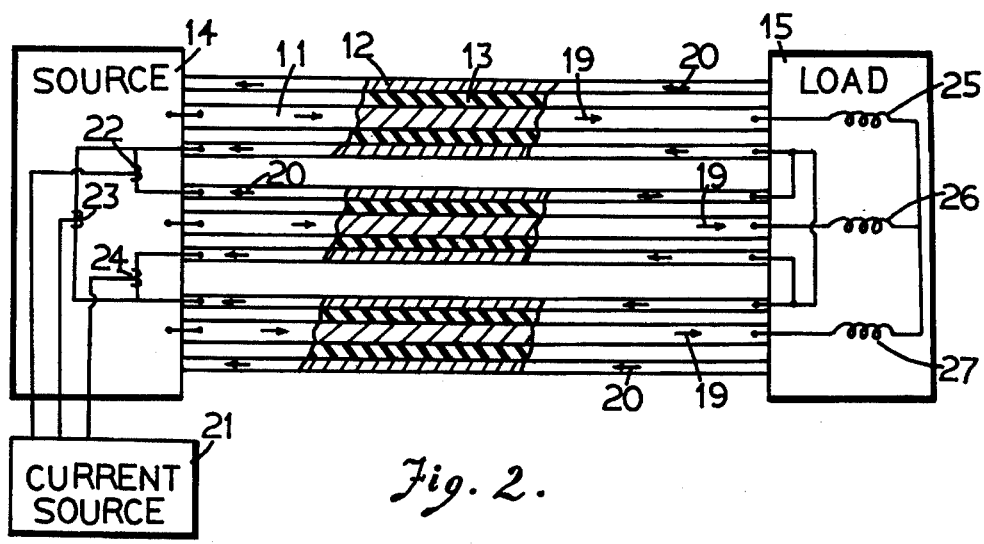
FIG. 2 shows a schematic diagram showing the system of the present invention in which external current sources are coupled to the sheath of the transmission lines to provide a supplementary current of equal magnitude and flowing in the opposite direction of the main current in the transmission lines.

Alternatively, as best shown in FIG. 2, in cases, for some practical reasons, when the load connection cannot be opened and transferred to the main switchboard 14 at the power station, an external controlled lower voltage current source 21 is provided to introduce the supplementary current in the sheath 12. Current transformers 22, 23 and 24 may be provided at the source station 14 for such purpose. The supplementary current in this case is again equal in magnitude and opposite in the direction of flow to that of the main current flowing in the main conductor 11. Such load may be typically a three-phase motor having its windings represented schematically by inductive load windings 25, 26 and 27. In such case, the magnetic fields generated by the main current flowing in the main conductor and the supplementary current flowing in the sheath are equal and opposite to one another and are neutralizing one another to result in substantially no net magnetic field radiating from the system.

Figure 3:
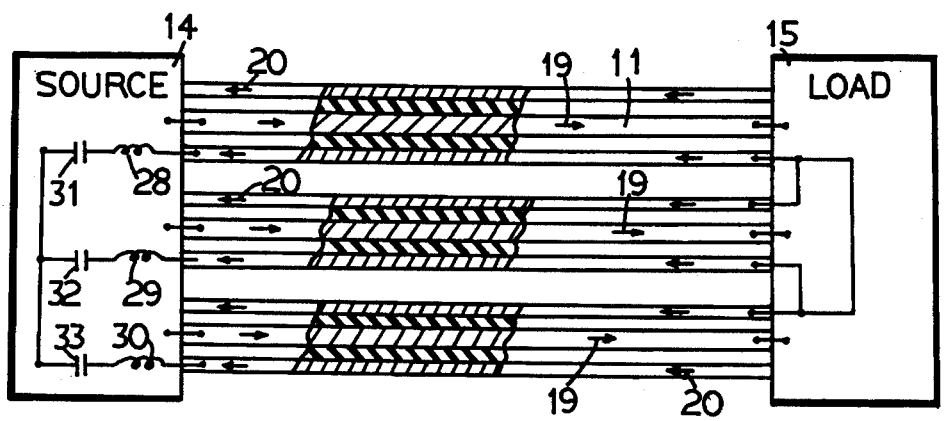
FIG. 3 is a partial electrical schematic diagram of the system of the present invention having current transformers coupled directly to the main conductors of the transmission lines to provide a supplementary current for the sheath of these transmission lines.

The external current source may be provided by employing current transformers 28, 29 and 30 as best shown schematically in FIG. 3 coupled to the main conductors 11 of each cable. The sheath reactance can be compensated by capacitors 31, 32 and 33 respectively in series with the respective current transformers.

In the embodiments shown above, the load windings are Y-connected, it can be appreciated by those skilled in the art that the load windings may also be delta-connected to achieve the same result. Furthermore, the same system is also applicable in a single phase system and direct current system by simply feeding the main current back to the power source switchboard through the sheath in the opposite direction, or using an adequate current source.

Obviously, numerous modifications and variations of the present invention are possible in light of the above teachings. It is therefore to be understood that within the scope of the appended claims, the invention may be practised otherwise than as specifically described herein.

What I claim is:

1. A method of substantially eliminating electromagnetic field radiation in an electrical power distribution system having power lines extending over a long distance between an electrical voltage source and a remotely located electrical load, comprising supplying the voltage from said voltage source to said load with single core coaxial cable members having a main conductor surrounded with an electrically conductive sheath means which is electrically insulated from the main conductor whereby by a main current flows in said main conductor to said load, supplying a supplementary current to said sheath means, said supplementary current being equal in magnitude and flowing in the opposite direction of said main current, and said supplementary current being provided by an external current source connected to said sheath means.

2. A method according to claim 1 wherein said supplementary current is provided by current transformer means connected to said main conductor of said cable members.

3. A method of substantially eliminating electromagnetic field radiation from an electrical power distribution system having plurality of power lines extending over along distance between a multi-phase electrical voltage source and a remotely located multi-phase electrical load, comprising connecting each phase of said voltage source to an associated phase of said load with a coaxial cable member, said cable member having a central electrically conductive core member surrounded with an electrically conductive outer sheath means, wherein said core member and said outer sheath means are electrically insulated from one another over their entire length, supplying said voltage to said load by said central electrically conductive core member whereby a main current in each phase flows in one direction to said associated phase of said load, supplying a supplementary current in each phase by said sheath means connected to said phase, said supplementary current being equal in magnitude and flowing the opposite direction to said one direction of a said main current in each phase, and wherein said supplementary current is supplied from a multi-phase control current source connected to said sheath means.

4. A substantially zero electromagnetic radiation electrical power distribution system having an electrical power source and a remotely located electrical load means, comprising coaxial cable means connecting between said power source and said load means, said cable means including a central electrical conductor member operative for conducting a main current in one direction to said load means, and an electrical conductive sheath means covering over the entire length of said central electrical conductor member, electrical insulation means disposed between said central electrical conductor member and said sheath means, current generating means connected to said conductive sheath means and operative to cause a supplementary current to flow in said sheath means, and said supplementary current flowing in a direction opposite to said one direction of said main current.

5. An electrical power distribution system according to claim 4 wherein said current generating means is a feedback means connected to said load means and said sheath means and operative to direct said supplementary current equal in magnitude and flowing in opposite direction of said main current.

6. An electrical power distribution system according to claim 4 wherein said current generating means is an external current generating means disposed at said load means and operative to inject said supplementary current equal in magnitude and flowing in the opposite direction of said main current in said sheath means.

7. An electrical power distribution system according to claim 4 including current transformer means coupled to said central electrical conductor members and said sheath means of said cable means and operative to generate said supplementary current to flow in said sheath means.

8. An electrical power distribution system according to claim 7 including capacitance means connected in series with said current transformer means.

\* \* \* \* \*